US00RE35395E

United States Patent [19]

Henry

[11] E Patent Number: Re. 35,395

[45] Reissued Date of Patent: Dec. 10, 1996

[54] LEAK DETECTION IN HEATING, VENTILATING AND AIR CONDITIONING SYSTEMS USING AN ENVIRONMENTALLY SAFE MATERIAL

[75] Inventor: Richard G. Henry, Mayfield Heights, Ohio

[73] Assignee: Bright Solutions, Inc., Troy, Mich.

[21] Appl. No.: 519,361

[22] Filed: Aug. 25, 1995

Related U.S. Patent Documents

Reissue of:

[64] Patent No.: 5,357,782
Issued: Oct. 25, 1994
Appl. No.: 81,119
Filed: Jun. 25, 1993

[51] Int. Cl.[6] ..... G01N 37/00

[52] U.S. Cl. ..... 73/40.7; 73/40.5 R; 250/301; 252/962; 252/964

[58] Field of Search ..... 73/40.7, 40.5; 250/301, 301.16, 301.21, 301.36; 252/963, 962, 964

[56] References Cited

U.S. PATENT DOCUMENTS

| | | | |
|---|---|---|---|
| 1,915,965 | 6/1933 | Williams | 73/40.5 |
| 2,096,099 | 10/1937 | Gaugler | 73/51 |
| 3,234,045 | 2/1966 | Larsen | 117/231 |
| 3,361,547 | 1/1968 | Packo | 48/193 |
| 3,572,085 | 3/1971 | Packo | 73/40.5 |
| 3,770,640 | 11/1973 | Bartlett | 252/68 |
| 4,758,366 | 7/1988 | Parekh | 252/68 |
| 4,938,063 | 7/1990 | Leighley | 73/40.7 |
| 5,149,453 | 9/1992 | Parekh | 252/68 |
| 5,167,867 | 12/1992 | Quaife et al. | 252/408.1 |
| 5,279,967 | 1/1994 | Bode | 436/56 |

*Primary Examiner*—Hezron E. Williams
*Assistant Examiner*—J. David Wiggins
*Attorney, Agent, or Firm*—Robert J. Black

[57] ABSTRACT

Refrigerant leakage in heating, ventilating and air conditioning systems employing hydrofluorocarbon refrigerants is determined by adding a mixture [of] *including* predetermined amounts of a napthalamide optical brightner [with an appropriate lubricant] to the system. Inspection of the system under ultraviolet light provides an indication of any leakage occuring in the system of liquid and/or gas.

8 Claims, No Drawings

LEAK DETECTION IN HEATING, VENTILATING AND AIR CONDITIONING SYSTEMS USING AN ENVIRONMENTALLY SAFE MATERIAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the effective leak detection in heating, ventilating and air conditioning systems and more particularly to such systems which utilize hydrofluorocarbon (HFC) refrigerants, by the addition of optical brighteners.

2. Background Art

Because of the damage that Freon® (CFC) refrigerants are doing to the ozone layer, it has become necessary for the development of alternative refrigerants which are environmentally friendly. DuPont, International Chemicals and others have developed HFC refrigerants, which are much safer in the environment and have an ozone depletion factor of 1, rather than an ozone depletion factor of 8, as is found for Freon refrigerants. The use of these new refrigerants has rendered prior leak detection systems employing materials such as those described in U.S. Pat. Nos. 4,758,366 and 5,149,453, both issued to Manher Parekh on Jul. 19, 1988 and Sep. 26, 1992, respectively, as ineffective. These patents teach yellow fluorescent dye dissolved with mineral oils which are hydrocarbons and therefore poorly soluble in the new polyalkylene glycol and polyol ester lubricants which are being used in the new HFC refrigerant containing systems. For this reason, the hydrocarbon soluble dyes described in the above referenced patents are not suitable for use in heating, ventilating and air conditioning systems employing the new HFC refrigerants.

The non-polar nature of the dyes disclosed by Parekh render them unsuitable for use in highly polar alcohol type refrigeration lubricants such as polyalkylene glycols. For this reason, the hydrocarbon soluble dyes described by Parekh are not suitable for use in the new HFC (Suva from DuPont) refrigerants.

The new HFC systems reach higher operating temperatures than the old CFC systems because of different thermodynamic properties. Typical operating temperatures of the new HFC refrigerant systems reach temperatures in excess of 420 degrees Fahrenheit while the old CFC systems reached temperatures of 300 degrees Fahrenheit. It is claimed by Parekh that the perylene fluorescent dyes are stable up to 400 degrees Fahrenheit. The temperature stability of the perylene dyes is actually much lower, about 250 degrees Fahrenheit.

This problem of poor temperature stability is clue to the highly delocalized electronic configuration of the perylene molecule. This delocalization of electrons is actually what gives the perylene molecule its fluroescence. When the perylene dye is exposed to 365 nanometer wavelength ultraviolet light, electrons are excited and jump to a higher energy level. This excitation happens only briefly and then the electrons fall back to their original energy level and emit photons of a specific wavelength which in this case is the wavelength for yellow light. When the perylene molecule is exposed to high temperatures, its electronic configuration is scattered and later permanently destroyed rendering it a non-fluorescent molecule and therefore ineffective at locating leaks. The perylene dyes described by Parekh were used to find leaks in oils and in systems which contain a hydrocarbon based fluid (which all refrigeration lubricants used in CFC containing systems are) to enable the user to find leaks. The perylene dyes claimed by Parekh have been used for over 60 years to find leaks in mineral based systems which are not exposed to high operating temperatures. Perylene dyes are therefore a poor choice for leak detection in systems which are exposed to elevated temperatures such as refrigeration systems which contain the new HFC refrigerant manufactured by DuPont called Suva. The perylene dyes described by Parekh work poorly in the elevated temperatures of the CFC containing systems and even worse in the new HFC containing systems where the operating temperatures are much higher, up to 420 degrees Fahrenheit. For these reasons, a new fluorescent dye composition is required for the HFC systems which use a new type of polar refrigeration lubricant and have very high operating temperatures.

For example, an automobile air conditioning system was charged with R-134a (DuPont). Approximately 0.1 grams of perylene fluorescent dye (FC-131 Morton Chemical) was added to 7.75 ounces of a polyalkylene glycol refrigerant lubricant and then scanned with an ultraviolet light. A bright yellow fluorescence was observed. The system was charged with the dye-lubricant mixture and then operated. A temperature gauge was attached to the evaporator core so that an accurate operating temperature could be measured. A valve was placed on a hose so that some refrigerant/oil could be released and then observed when an ultraviolet lamp was used. Table I shows the results obtained.

TABLE I

| Operating Time (Minutes) | Operating Temp (degrees F.) | Fluorescence of Dye/Refrig./Oil |
|---|---|---|
| 2 | 110 | Excellent |
| 5 | 230 | Good |
| 7 | 250 | Weak |
| 10 | 290 | None |
| 12 | 310 | None |
| 15 | 380 | None |

SUMMARY OF THE INVENTION

It is the object of the present invention to provide an improved leak detection composition which incorporates an alcohol soluble optical brightener dye into a mineral oil, a polyalkylene glycol or polyol ester refrigeration lubricant. This combination of brightener and lubricant will then be incorporated into a refrigeration system with the object being to locate leaks developed within the system.

It has been found that the new leak detection additives described herein will have excellent oxidation stability up to 470 degrees Fahrenheit and may be left inside the system for the location of leaks on future occasions. The brightener disclosed is particularly intended for use in HFC refrigerants employing a 1,1,1,2-tetrafluoroethane (R-134a). The brightener will be circulated throughout the refrigeration system and the system will be inspected with an ultraviolet light (black light) having an emission wavelength of 365 nanometers.

The preferred composition disclosed herein utilizes an optical brightener similar to those used in the past to improve the whiteness of textiles. These optical brighteners are invisible in ordinary light and make a perfectly clear water white solution. When an ultraviolet lamp is directed at the lubricant/brightener mixture, a striking fluorescence is immediately noticeable. Another advantage of these optical brighteners is that they are able to fluoresce with the refrigerant gas itself and not just the lubricant. The yellow fluorescent dyes described in the aforementioned patents work only on the lubricant and not the refrigerant gas when incorporated into the new HFC systems.

DETAILED DESCRIPTION OF THE PREFERRED EMBODIMENTS

The present invention is directed to the detection of leaks in refrigeration systems employing the new HFC environmentally safe refrigerants. The refrigeration system would employ a refrigeration liquid comprising a HFC refrigerant, a mineral oil, a polyalkylene glycol or polyol ester refrigerant lubricant having at least 0.001 grams of optical brightener dissolved per 100 grams of refrigeration liquid.

In one practical embodiment of the present invention a mixture of 0.5 grams of naphthalamide dye was individually mixed with 1 ounce of mineral oil, polyalkylene glycol, and polyol ester refrigeration lubricants. Approximately ¼ ounce of each of these dye mixtures was added to three different automotive air conditioning systems.

The dye/mineral oil mixture was added to a CFC containing system. The CFC system was then charged with R-134a (DuPont) and 9.75 fluid ounces of mineral oil lubricant were added to the system. The system was then operated for 5 minutes to allow the dye mixture to mix with the mineral oil. The system was then scanned with an ultraviolet lamp to check for leads. A greenish-blue color was seen at a pinpoint leak in a black EPDM hose. This greenish-blue color indicated a leak in the CFC system.

The dye/polyalkylene glycol mixture and the dye/ester mixture were added to the lubricant reservoir of two separate automotive air conditioning systems and the process of finding leaks was followed according to the above. This time a greenyellow fluorescence was seen at the leak site after irradiation with UV light.

While but three embodiments of the present invention have been disclosed, it will be obvious to those skilled in the art that numerous modifications may be made without departing from the spirit of the present invention which shall be limited only by the scope of the claims appended hereto.

What is claimed is:

1. A method of detecting leaks in heating, ventilating and air conditioning systems employing hydrofluorocarbon refrigerants and a refrigerant lubricant comprising the steps of:

preparing a mixture [of] *including* naphthalamide as a fluorescent optical brightener [with a refrigerant lubricant];

adding a predetermined amount of the mixture to the lubricant reservoir of the heating, ventilating and air conditioning system employing a refrigerant liquid consisting of a hydrofluorocarbon refrigerant and a refrigerant lubricant;

operating the system for a predetermined period to allow the mixture to thoroughly mix with the refrigerant liquid throughout the system;

examining the system with an ultraviolet lamp directed at the system;

determining the presence of a leak by the presence of a colored fluorescence detectable under the ultraviolet light;

and said naphthalamide and refrigerant lubricant appearing at a leak sight remaining to provide an indication of said leak.

2. A method of detecting leaks in heating, ventilating and air conditioning systems as claimed in claim 1 wherein:

said adding step consists of the addition of at least 0.001 grams of said mixture to a system employing a mineral oil refrigerant lubricant for each 100 grams of said mineral oil refrigerant lubricant.

3. A method of detecting leaks in heating, ventilating and air conditioning systems as claimed in claim 1 wherein:

said adding step consists of the addition of at least 0.001 grams or said mixture to a system employing a polyalkylene glycol refrigerant lubricant for each 100 grams of said polyalkylene glycol refrigerant lubricant.

4. A method of detecting leaks in heating, ventilating and air conditioning systems as claimed in claim 1 wherein:

said adding step consists of the addition of at least 0.001 grams of said mixture to a system employing a polyol ester refrigerant lubricant for each 100 grams of said polyol ester refrigerant lubricant.

5. A method of detecting leaks in heating, ventilating and air conditioning systems as claimed in claim 2 wherein:

said mixture consists of 0.5 grams of naphthalamide fluorescent optical brightener with 1 fluid ounce of mineral oil.

6. A method of detecting leaks in heating, ventilating and air conditioning systems as claimed in claim 3 wherein:

said mixture consists of 0.5 grams of naphthalamide fluorescent optical brightener with 1 fluid ounce of polyalkylene glycol.

7. A method of detecting leads in heating, ventilating and air conditioning systems as claimed in claim 4 wherein:

said mixture consists of 0.5 grams of naphthalamide fluorescent optical brightener with 1 fluid ounce of polyol ester.

8. A method of detecting leaks in heating, ventilating and air conditioning systems as claimed in claim 1 wherein:

said mixture of naphthalamide optical brightener and refrigerant lubricant are allowed to remain in the system to provide an indication of possible future leaks.

* * * * *